May 15, 1956 L. A. KASPARSON 2,745,184
CALIPERING MECHANISMS
Filed Dec. 20, 1954

INVENTOR.
LENNART A. KASPARSON
BY
ATTORNEY

United States Patent Office 2,745,184
Patented May 15, 1956

2,745,184
CALIPERING MECHANISMS

Lennart A. Kasparson, Worcester, Mass., assignor to Norton Company, Worcester, Mass., a corporation of Massachusetts Application December 20, 1954, Serial No. 476,161

11 Claims. (Cl. 33—178)

The invention relates to calipering mechanisms.

One object of the invention is to provide a superior calipering mechanism for machine tools, for example for grinding machines and lathes. Another object of the invention is to provide a simple accurate calipering mechanism that can be set and reset expeditiously. Another object of the invention is to provide a calipering mechanism which can be set to a given diameter of workpiece without the use of a wrench, a screw driver or other hand tool. Another object of the invention is to provide a workpiece diameter calipering mechanism having one or more of the foregoing advantages operating on the three point principle that three points determine a circle. Another object of the invention is to provide a calipering mechanism of the type indicated with backlash eliminators to achieve accuracy.

Other objects will be in part obvious or in part pointed out hereinafter.

Figure 1:
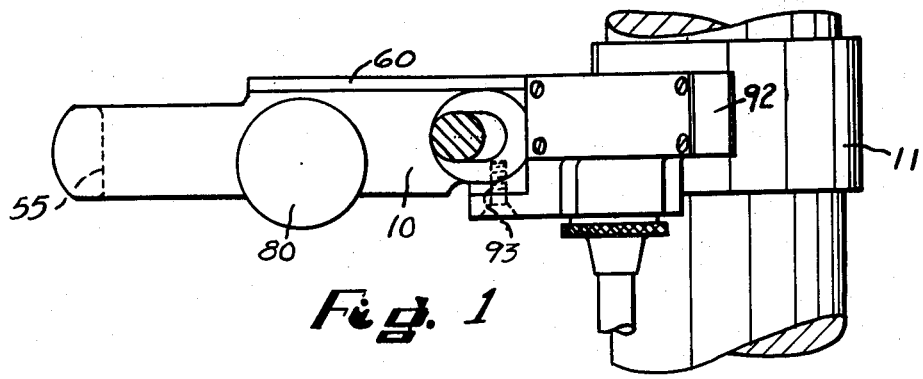
Figure 3:
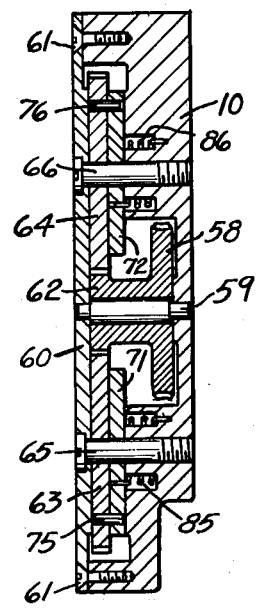
Figure 2:
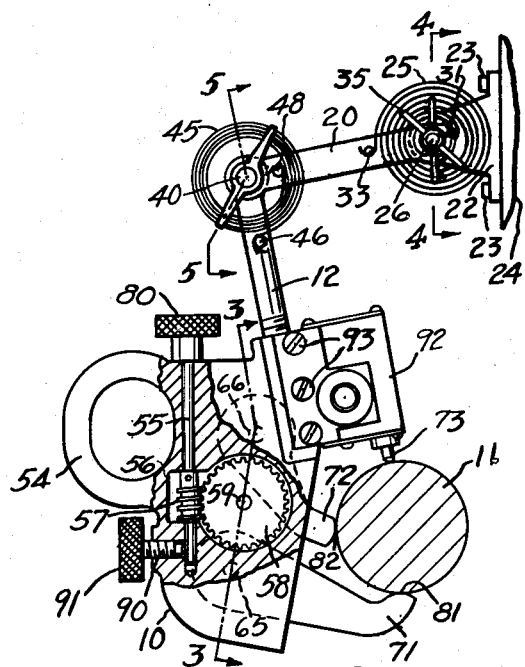
Figure 4:
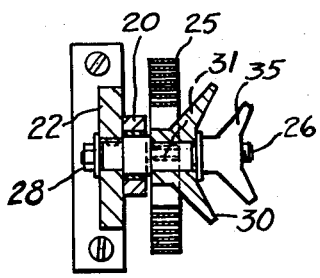
Figure 5:
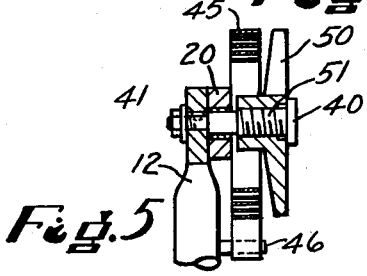

In the accompanying drawings illustrating one of many possible embodiments of the calipering mechanism of this invention, Figure 1 is a plan view, Figure 2 is a side elevation, part of the casing being broken away the better to show the operating worm drive, Figure 3 is a sectional view on an enlarged scale taken along the line 3—3 of Figure 2, Figures 4 and 5 are sectional views on an enlarged scale taken respectively along the lines 4—4 and 5—5 of Figure 2.

Referring now to Figures 1 and 2, the casing 10 of my calipering mechanism can be supported and urged into engagement with the workpiece 11 by any suitable mechanism but for illustration I show a rod 12 the end of which is threaded and which is screwed into a hole in the casing 10, the rod 12 being pivotally connected to a rod 20 which is pivotally connected to a bracket 22 secured by bolts 23 to a frame element 24 that is stationary with respect to the work centers, not shown, of the machine tool to which this invention is applied.

Referring now to Figures 2 and 4, the weight of the casing 10 and the mechanisms therein contained and also the weight of the rods 12 and 20 and associated parts can be nicely balanced by a clock spring 25. A stud 26 which has several diameters and is threaded at both ends extends through the bracket 22 and is secured thereto by means of a nut 28. It also extends through the end of the rod 20. A two arm holder and tightener 30 has a slot 31 which holds one end of the clock spring 25 while the other end thereof is held by a pin 33 on the rod 20. When, with a wrench if necessary, the tightener 30 has been turned to tighten the spring to balance the weights with the casing 10 at the proper level, a nut 35 on the stud 26 can be tightened to hold the adjustment.

Referring now to Figures 2 and 5, a stud 40 of several diameters passes through both of the rods 12 and 20 and is secured in place by means of a nut 41 on a threaded end of the stud 40 but without binding the rods. A clock spring 45 has one end secured to a pin 46 on the arm 12 and the other end secured to a pin 48 on the arm 20. It urges the rod 12 counterclockwise to urge the casing towards the workpiece 11, but when a wing nut 50 on a threaded portion 51 of the stud 40 is turned to the right the rods 12 and 20 are locked together. Thus the casing 10 can be withdrawn by grasping a handle 54 and then held away from the workpiece 11 for replacement with another one by tightening the wing nut 50.

Referring now to Figure 2, a shaft 55 is journalled in the casing 10 and has secured thereto in a cut-out 56 a worm 57 which is in engagement with a worm wheel 58 mounted on a shaft 59. Referring now to Figure 3 the shaft 59 is at one end journalled in the casing 10 and at the other end journalled in a casing plate 60 secured to the casing 10 by means of screws 61. Still referring to Figure 3, integral with the worm wheel 58 is a spur gear 62 which engages spur gears 63 and 64 journalled on studs 65 and 66 which extend through the plate 60 and, being threaded at the ends, are screwed into the casing 10.

Referring to Figure 2, calipering arms 71 and 72 cooperate with a calipering plunger 73 to measure the diameter of the workpiece 11. Comparing Figures 2 and 3, the arms 71 and 72 are pinned by means of pins 75 and 76 to the gears 63 and 64 respectively and they are journalled on the studs 65 and 66 respectively. It will now be seen that when a knurled head 80 secured to the shaft 56 is turned, the arms 71 and 72 will be turned in the same direction. These arms 71 and 72 have rounded work engaging surfaces 81 and 82 and the plunger 73 has a rounded work engaging surface 83. To eliminate backlash springs 85 and 86 are located in the casing 10 with one end of each secured to the casing and the other end of each in a hole in one of the respective arms 71 and 72. These springs 85 and 86 are initially tensioned to rotate the arms 71 and 72 clockwise but they are not powerful enough to permit the worm wheel 58 to drive the worm 57 against the friction of the shaft 55 in its bearings. However, they eliminate backlash between the gear 62 and the gears 63 and 64. By turning the knurled head 80 the arms 71 and 72 can be advanced counter-clockwise and then a screw 90 extending into a threaded bore in the casing 10 can be tightened by means of a knurled head 91 thereon to lock the shaft 55 so that vibration will not cause the arms 71 and 72 to retreat. Whenever it is desired to open the gap, the screw 90 is first retreated and then the knurled head 80 can be turned in the proper direction to move the arms 71 and 72 clockwise for a new setting. It is contemplated that the arms 71 and 72 will be set against a workpiece gauge of the desired final diameter of the workpiece 11.

The plunger 73 is movable in a casing 92 attached as by means of screws 93 to the casing 10 and in the casing 92 can be located any kind of an indicating mechanism to provide an indication of any kind indicating the diameter of the workpiece or, preferably, apparatus to provide a signal such as an electric signal when the workpiece comes to the desired size. I contemplate the use of a linear variable differential transformer in the casing 92 which can be embodied in a very small system of coils with a movable core, connected to the plunger 73 or a part thereof, and this can be connected through a cable (not shown) to operate the machine tool for example to cause the cross slide of a lathe which holds the tool to withdraw or to cause the wheel slide of a grinding machine to withdraw. Such mechanisms are now known to the art as are linear variable differential transformers and as my invention relates to the calipering mechanism itself I need not describe the other apparatus.

My calipering mechanism permits quick adjustment of both arms 71 and 72 with their calipering surfaces 81 and 82 which by tangency with the workpiece 1 determine two points of the circle, whereas the rounded surface 83 on the plunger 73 by tangency with the workpiece determines a third point of the circle. As the workpiece decreases in diameter the plunger 73 urged outwardly by spring pressure, by pneumatic pressure or by electromagnetic force or otherwise moves downwardly either gradually changing the indication of work size or ultimately giving an electric signal or any other kind of a signal. The calipering mechanism according to this invention may be quickly adjusted as there is only one adjustment to make. In the case of the use of a mechanism giving an electrical signal, using a gauge of the desired diameter in place of the workpiece 11, the knurled head 80 should be turned to move the arms 71 and 72 clockwise until the signal is given. Of course the calipering mechanism is first opened up by moving the arms 71 and 72 clockwise to adjust the three points even with the plunger 73 fully extended to a size larger than the gauge and then the knurled head 80 is turned in the direction gradually to close the points, that is by moving the arms 71 and 72 counterclockwise, then the electric circuit is energized and finally the mechanism is slowly opened again until the signal is made. Or, in case a dial indicator is used, the arms 71 and 72 are moved back and forth in contact with the gauge and with the plunger 73 in contact with the gauge until the dial indicates the desired finished size. In the drawings rotating the head to the right (clockwise) closes the calipering mechanism (moves the arms 71 and 72 counterclockwise).

The arms 71 and 72 are movable calipering elements which are settable but inactive in a calipering operation. The plunger 73 is an active caliper, the movement of which gives the signal or moves a dial or indicator of some kind. The knurled head 80 with the shaft 55 is a mover to set the inactive calipering elements. It is connected by means of the mechanical connections, the worm 57, the worm wheel 58, the gear 62, the gears 63 and 64 to the inactive calipering elements, to wit, the arms 71 and 72.

While the settable but inactive calipering elements might be other than pivotally mounted arms, simplicity in mechanical compactness is achieved by having them embodied in the form of pivotally mounted arms. The active calipering element, namely the caliper 73, might be other than a plunger but compactness is better achieved by embodying it in the form of a plunger.

There is advantage in using a worm and worm wheel drive for the settable but inactive calipers as thereby mechanical reduction is obtained with few moving parts and furthermore the natural resistance of a worm to retrograde pressure by its worm wheel makes it possible to use the blacklash springs 86 in combination therewith to prevent retrograde movement of the settable calipering elements whenever the operator takes his fingers off the head 80. It will be seen that my entire calipering mechanism is compact and of such nature that it can be embodied in a very accurate mechanism.

The gear 62 is functionally a pinion gear driving a pair of gears 63 and 64 which are the output gears. It will be seen that the pinion gear 62 is coupled to the worm wheel 58. The active caliper 73, in one way or another, registers the size of the workpiece as whether it moves a dial or ultimately gives a signal either action is registering size.

It will thus be seen that there has been provided by this invention a calipering mechanism in accordance with which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a calipering mechanism, a worm, a worm wheel driven by said worm, three movable calipering elements two of which are settable but inactive in a calipering operation and the third of which is the active caliper, gearing connecting the worm wheel to each of the settable but inactive calipering elements, and backlash preventing members one connected to each settable but inactive caliper and connected to move said worm wheel in the retrograde mechanism opening direction but not powerful enough to turn said worm.

2. A calipering mechanism according to claim 1 having a lock positively to lock the worm so that vibration will not disturb the setting of the settable calipering elements.

3. A calipering mechanism according to claim 2 in which the gearing connecting the worm wheel to each of the settable but inactive calipering elements includes a pair of output gears in mesh with a pinion gear connected to said worm wheel.

4. A calipering mechanism according to claim 3 in which the settable but inactive calipering elements are pivotally mounted arms.

5. A calipering mechanism according to claim 1 in which the gearing connecting the worm wheel to each of the settable but inactive calipering elements includes a pair of output gears in mesh with a pinion gear connected to said worm wheel.

6. A calipering mechanism according to claim 5 in which the settable but inactive calipering elements are pivotally mounted arms.

7. A calipering mechanism according to claim 1 in which the settable but inactive calipering elements are pivotally mounted arms.

8. A calipering mechanism according to claim 7 having a lock positively to lock the worm so that vibration will not disturb the setting of the settable calipering elements.

9. In a calipering mechanism, three movable calipering elements two of which are pivotally mounted arms and are settable but inactive in a calipering operation, and the third of which is the active caliper, two spring backlash preventers one connected to each of said arms, a mover to set the inactive calipering elements, and mechanical connections including a worm, a worm wheel and a set of gears between said mover and each of said inactive calipering elements to move and thereby to set them simultaneously by the movement of said mover.

10. In a calipering mechanism, three movable calipering elements two of which are settable but inactive in a calipering operation, and the third of which is the active caliper, two spring backlash preventers one connected to each of the inactive calipering elements, a mover to set the inactive calipering elements, and mechanical connections including a worm, a worm wheel and a set of gears between said mover and each of said inactive calipering elements to move and thereby to set them simultaneously by the movement of said mover.

11. In a calipering mechanism, three movable calipering elements two of which are pivotally mounted arms and are settable but inactive in a calipering operation, and the third of which is the active caliper, a mover to set the inactive calipering elements, and mechanical connections including a worm, a worm wheel and a set of gears between said mover and each of said inactive calipering elements to move and thereby to set them simultaneously by the movement of said mover.

References Cited in the file of this patent

UNITED STATES PATENTS

| | | |
|---|---|---|
| 1,217,850 | Smith | Feb. 27, 1917 |
| 1,591,261 | Ames | July 6, 1926 |
| 2,249,904 | Lewis | July 22, 1941 |
| 2,260,354 | Wallace | Oct. 28, 1941 |

FOREIGN PATENTS

| | | |
|---|---|---|
| 399,007 | Italy | Oct. 14, 1942 |